(12) United States Patent
Schmidt

(10) Patent No.: US 11,027,493 B2
(45) Date of Patent: Jun. 8, 2021

(54) ADDITIVE MANUFACTURING OF A 3D PART

(71) Applicant: DASSAULT SYSTEMES, Velizy Villacoublay (FR)

(72) Inventor: Martin-Pierre Schmidt, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 272 days.

(21) Appl. No.: 16/186,094

(22) Filed: Nov. 9, 2018

(65) Prior Publication Data

US 2019/0134915 A1 May 9, 2019

(30) Foreign Application Priority Data

Nov. 9, 2017 (EP) .................................... 17306558

(51) Int. Cl.
*B29C 64/393* (2017.01)
*G05B 19/4099* (2006.01)
(Continued)

(52) U.S. Cl.
CPC .......... *B29C 64/393* (2017.08); *B29C 64/386* (2017.08); *B33Y 50/00* (2014.12);
(Continued)

(58) Field of Classification Search
CPC ..... B29C 64/393; B29C 64/386; B33Y 50/00; B33Y 50/02; G06F 30/23; G06F 30/00;
(Continued)

(56) References Cited

U.S. PATENT DOCUMENTS 9,701,018 B2 * 7/2017 Linnell .................. B25J 9/1664
9,881,388 B2 * 1/2018 Rorato .................... G06T 9/001
(Continued)

FOREIGN PATENT DOCUMENTS

EP     2254013 A1 * 11/2010 ......... G05B 19/4097
EP     2254092 A2 * 11/2010 ............. G06F 30/17

OTHER PUBLICATIONS

B. Benes et al., "Layered Data Representation for Visual Simulation of Terrain Erosion," 2001, Publisher: IEEE.*
(Continued)

*Primary Examiner* — Tuan C To
(74) *Attorney, Agent, or Firm* — Oblon, McClelland, Maier & Neustadt, L.L.P.

(57) ABSTRACT

Described is a computer-implemented method of additive manufacturing of a three-dimensional part. The method includes obtaining a surface representation of a 3D part in a 3D scene, the surface representation being enclosed inside a bounding volume, discretizing the scene into voxels, forming an unsigned distance field by storing a minimal distance value to the surface representation of the part for each voxel, determining one or more voxels located outside the bounding volume, the one or more voxels located outside the bounding volume being associated with a label, propagating by flood filling the label until a stopping condition is met, which is reaching a gradient inversion of the distance field, inverting the sign of the distance value of all unlabeled voxels so as to obtain a signed distance field, computing an iso-surface of the part at iso-value zero based on the signed distance field, and additive manufacturing the part.

19 Claims, 8 Drawing Sheets

(51) Int. Cl.
*G06T 17/20* (2006.01)
*G06T 17/00* (2006.01)
*B33Y 50/00* (2015.01)
*B29C 64/386* (2017.01)
*G06F 30/00* (2020.01)
*G06F 30/17* (2020.01)
*G06F 30/23* (2020.01)
*B33Y 50/02* (2015.01)
*G06F 119/18* (2020.01)

(52) U.S. Cl.
CPC ......... *G05B 19/4099* (2013.01); *G06F 30/00* (2020.01); *G06F 30/17* (2020.01); *G06F 30/23* (2020.01); *G06T 17/00* (2013.01); *G06T 17/20* (2013.01); *B33Y 50/02* (2014.12); *G05B 2219/49023* (2013.01); *G06F 2119/18* (2020.01)

(58) Field of Classification Search
CPC . G06F 30/17; G06F 2119/18; G05B 19/4099; G05B 2219/49023; G06T 17/00; G06T 17/20
USPC .......................................................... 701/98
See application file for complete search history.

(56) References Cited

U.S. PATENT DOCUMENTS

| | | | |
|---|---|---|---|
| 10,303,784 B2 * | 5/2019 | Rorato | G06T 17/20 |
| 10,336,000 B2 * | 7/2019 | Goldman | B29C 64/135 |
| 10,336,051 B2 * | 7/2019 | Utsunomiya | B29C 64/112 |
| 10,620,611 B2 * | 4/2020 | Meess | B29C 64/386 |
| 10,675,857 B2 * | 6/2020 | Nordback | B33Y 50/02 |
| 2007/0007382 A1 * | 1/2007 | De Hillerin | G06F 30/23 244/3.1 |
| 2009/0082891 A1 * | 3/2009 | Tang | G05B 19/41805 700/100 |
| 2011/0007933 A1 * | 1/2011 | Lempitsky | G06T 17/00 382/100 |
| 2012/0281013 A1 * | 11/2012 | Mahdavi | G06F 30/00 345/619 |
| 2015/0096266 A1 * | 4/2015 | Divine | B29C 64/176 53/452 |
| 2015/0231827 A1 * | 8/2015 | Uzan | B29C 64/232 425/375 |
| 2016/0221259 A1 * | 8/2016 | Kobida | B29C 64/106 |
| 2017/0015057 A1 | 1/2017 | Stevens et al. | |
| 2020/0171750 A1 * | 6/2020 | Beckmann | B29C 64/386 |
| 2020/0202467 A1 * | 6/2020 | Salvo | G06Q 20/108 |
| 2020/0214870 A1 * | 7/2020 | Washizu | B29C 64/153 |
| 2020/0233400 A1 * | 7/2020 | Wright | B29C 64/393 |

OTHER PUBLICATIONS

J. Peter et al., "Analytical Versus Voxelized Phantom Representation for Monte Carlo Simulation in Radiological Imaging," 2000, vol. 19, Publisher: IEEE.*

K.R. Subramanian et al., "Applying Space Subdivision Techniques to Volume Rendering," 1990, Publisher: IEEE.*

Extended European Searth Report dated Apr. 12, 2018, in European Patent Application No. 17306558.2-1224 (14 pgs.).

Kenny Erleben, et al.; "Signed Distance Fields Using Single-Pass GPU Scan Conversion of Tetrahedra", (23 pgs.).

Young J. Kim, et al.; "Fast Swept Volume Approximation of Complex Polyhedral Models"; SM'03, Jun. 16-20, 2003, Seattle, Washington, USA (12 pgs.).

* cited by examiner

ADDITIVE MANUFACTURING OF A 3D PART

CROSS-REFERENCE TO RELATED APPLICATIONS

This application claims priority under 35 U.S.C. § 119 or 365 to European Application No. 17306558.2, filed Nov. 9, 2017. The entire contents of the above application(s) are incorporated herein by reference.

FIELD OF THE INVENTION

The invention relates to the field of computer programs and systems, and more specifically to a method, system and program for of additive manufacturing of a three-dimensional (3D) part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behaviour of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Additive Manufacturing is the technologies that build three-dimensional (3D) objects by adding layer-upon-layer of material. The material may be plastic, metal, concrete . . . . The term AM encompasses many technologies including subsets like, but is not limited to, 3D Printing, Rapid Prototyping (RP), layered manufacturing and additive fabrication. AM technologies relies on the use of a computer, 3D modeling software such as CAD software, machine equipment dedicated to the building of 3D objects (also referred to as AM printer), and layering material used for building the object. Once a CAD modeled object has been modeled by use of a 3D modeling software, the data of the CAD file associated to the CAD modeled object is read by the AM printer. The CAD file contains specifications, from which geometry may be generated, which in turn allows for a representation to be generated by the CAD software. Then, the AM printer lays downs or adds successive layers of liquid, powder, sheet material or other, in a layer-upon-layer fashion to fabricate a 3D object.

An important requirement of a 3D object to be printed by an AM printer is that delimitations between different volume regions of the 3D object have to be unambiguous. The delimitations are used to create closed "watertight" surfaces. If the surfaces of the 3D model are not "watertight" surfaces, the AM printer is not able to correctly interpret the data of the CAD file, and thus is not to print the 3D object represented by the CAD file. Alternatively, even if the AM printer is able to print the 3D object, the final result can be different from the original representation of the CAD file, and these discrepancies can be observed only after that the 3D object has been built; consequently, raw material used for building the 3D object are wasted.

There are two main ways to digitally represent 3D objects. The first one is 3D object representation by its surface. The 3D object is described by a set of elements (polygonal faces, edges, points . . . ) following its boundary. This is the most common representation because of its low memory footprint and high precision. The notion of regions like "inside" and "outside" is implicit: the region changes every time one passes "through" the surface. However, the delimitations between the regions become ambiguous if the surface of the 3D representation contains holes, is non-manifold or intersects with other surfaces.

A second 3D representation of a 3D object is a volume representation. The 3D object is described by a set of smaller volume elements in a grid (generally tetrahedra or hexahedra) filling the solid region of the object or the entire 3D space. These elements, called voxels, often each have one or multiple scalar values defining the property of the object at that point in space (e.g. density, color . . . ). For a given object, the volume scales with the cube of its size (as opposed to the square of its size for the surface). This representation is always unambiguous as it explicitly describes the solid region and not just its surface. However, a volume based representation tends to have a much higher memory footprint.

As previously discussed, the notion of clearly defined regions is critical as it is the link between the digital representation of an object and its real-life counterpart (the printed 3D object). Without clearly defined regions the usefulness of a 3D object is drastically reduced. For example, it cannot be manufactured or 3D printed directly, it is impossible to evaluate its mass or display it on screen unambiguously. With this consideration, multiple methods aim at providing ways to repair 3D Objects.

Hole Filling methods work exclusively on surface representations. They can help closing holes in a surface before attempting to use Boolean operations. These methods work by selecting a set of edges surrounding the hole and generating a set of additional faces forming a cap to close the hole. The automatic selection of edges is however a very difficult problem and this method is very prone to generating non-manifold, badly oriented or twisted surfaces.

Boolean Operations work exclusively on surface representations made of one or multiple polyhedrons (set of interconnected faces forming the surface as a mesh). They are a powerful tool capable of solving intersections with high accuracy. It is also used by Constructive Solid Geometry as a way to construct 3D objects through a succession of Boolean operations. They also only modify the geometry near the intersections and thus can preserve all the detail and sharpness of the input object. However, they have a high computational cost and only work with properly oriented, manifold surfaces without holes. They are also often unreliable in cases of tangent contacts due to the floating-point numbers limited accuracy.

Morphological operations are one of the main tools to repair volume representations of 3D Objects. They can process convoluted geometries quickly thanks to their easy parallelization and independence to the complexity of the topology of the 3D Object. Methods like the Dilation-Erosion technique can close holes and solve intersections very reliably and always produce a valid unambiguous object. They however suffer from a heavy memory footprint and tend to fade the details and sharpness of the 3D Objects they process.

Within this context, there is still a need for an improved method, system and program for of additive manufacturing of a three-dimensional (3D) part. Notably, for any 3D representation, the field of AM requires perfect unambiguity. Mesh Generation needs a high robustness to low quality or incomplete data and the ability to handle massive amount of input data.

SUMMARY OF THE INVENTION

It is therefore provided a computer-implemented method of additive manufacturing of a three-dimensional (3D) part. The method comprises providing a surface representation of a 3D part in a 3D scene, the surface representation being enclosed inside a bounding volume. The method also comprises discretizing the 3D scene into voxels. Then, an unsigned distance field is formed by storing a minimal distance value to the surface representation of the 3D part for each voxel. The method further comprises determining one or more voxels located outside the bounding volume, the one or more voxels located outside the bounding volume being associated with a label. The label is propagated by flood filling until a stopping condition is met, which is reaching a gradient inversion of the distance field. The method further comprises inverting the sign of the distance value of all unlabelled voxels so as to obtain a signed distance field. The method also comprise computing an iso-surface of the 3D part at iso-value zero based on the signed distance field. Next, the method comprises additive manufacturing (S80) the 3D part.

The method may comprise one or more of the following:
storing a minimal distance value to the surface representation of the 3D part for each voxel further comprises:
determining the voxels having a minimal distance value that is greater than a band size, the band size being a pre-determined distance value; assigning a same value to the determined voxels, this same value being different from the values comprises between 0 and the band size;
the band size is equal to or greater than twice a size of a voxel;
the minimal distance values are stored in a first matrix, each cell of the first matrix corresponding to a voxel with a set of coordinates in the 3D space and each cell of the first matrix containing a scalar value, the set of cells of the first matrix forming a scalar field;
the values of the voxels having a minimal distance value that is greater than the band size are not stored in the matrix;
before discretizing the 3D scene, selecting a size of the voxels that discretize the 3D scene;
storing in a second matrix all labels associated with voxels;
wherein the first matrix and the second matrix are distinct;

propagating by flood filling the label until a stopping condition is met comprises comparing the value of the minimal distance value of labelled voxel with the value of the minimal distance value of a neighbor unlabelled voxel; propagating the label to the unlabelled voxel if the minimal distance value of the neighbor unlabeled voxel is equal or lower that the value of the minimal distance value of labelled voxel;

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
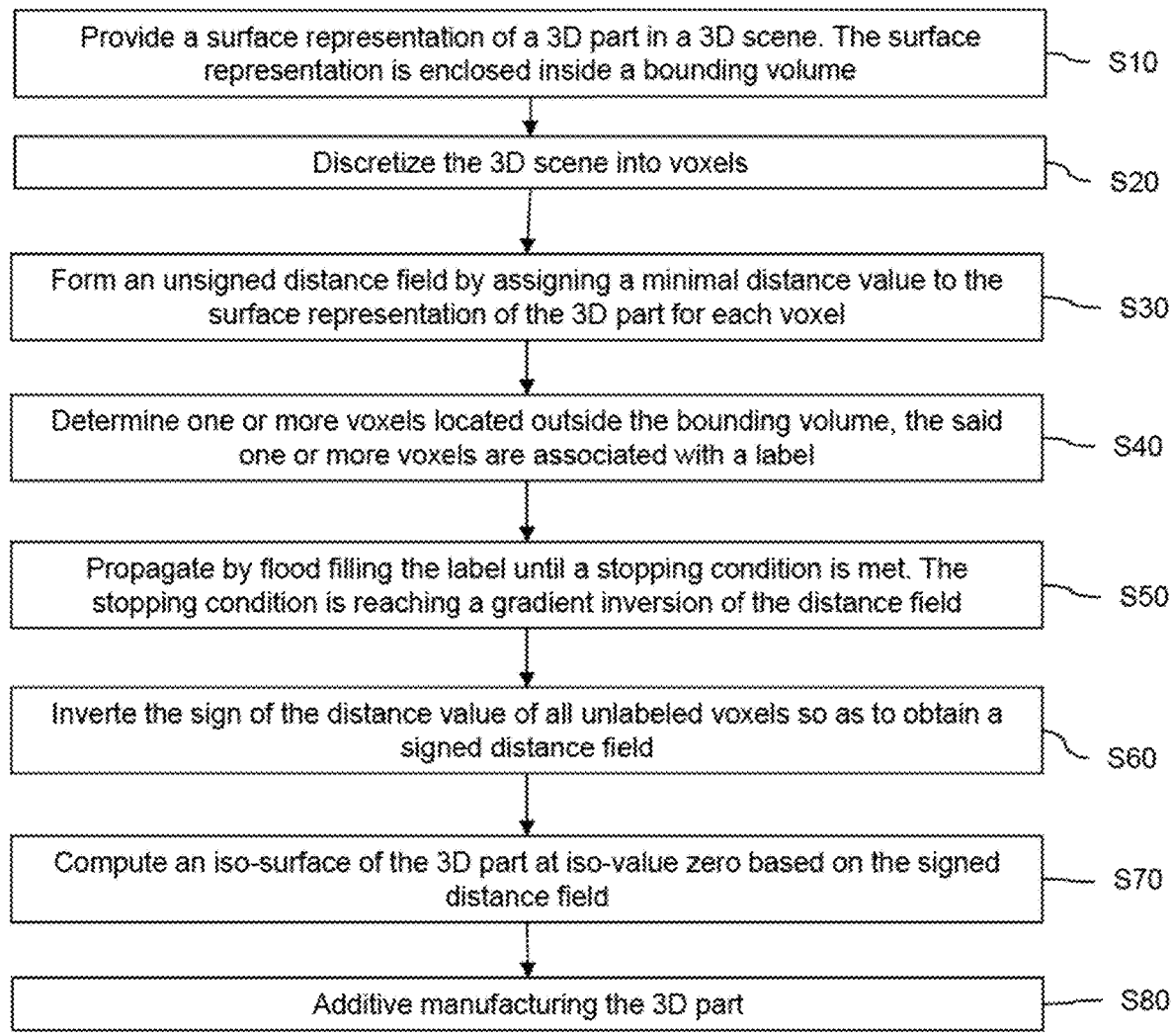
FIG. 1 shows a flowchart of an example of the method.

With reference to the flowchart of FIG. 1, it is proposed a computer-implemented method of additive manufacturing of a three-dimensional (3D) part. The method comprises providing a surface representation of a 3D part in a 3D scene. The surface representation of the 3D part is enclosed inside a bounding volume (BB). The method further comprises discretizing the 3D scene into voxels. Then, an unsigned distance field is formed by storing a minimal distance value to the surface representation of the 3D part for each voxel. Next, one or more voxels located outside the bounding volume are determined or identified. The one or more voxels located outside the bounding volume are associated with a label. Next, the label is propagated by flood filling until a stopping condition is met. The stopping condition is reaching a gradient inversion of the unsigned distance field. Then, the sign of the distance value of all unlabeled voxels is inverted. As a result, a signed distance field is obtained. An iso-surface of the 3D part at iso-value zero is computed, the computation being based on the signed distance field. Then a 3D part is additive manufactured.

Such a method improves the generation of an unambiguous delimitation between different volume regions of any 3D object surface representation. First, an unsigned distance field of a minimal distance value to the surface representation of the 3D part for each voxel is formed. A minimal distance scalar field is thus obtained, which is a grid of real values of the minimal distances. Interestingly, this minimal distance scalar field allows identifying a specific thickness around the input elements, that is around the surface representation provided in input. Then, using a Flood Fill method, labels are propagated with a stopping condition of the propagation that is the inversion of the gradient of the underlying unsigned distance field. This allows denoting regions, typically a region outside the 3D part and a region inside the 3D part. Here, each contiguous collection of voxels sharing the same label represents a region. Next, the boundaries around each labelled region are computed using an iso-surface reconstruction method. The iso-value is set to zero. An unambiguous closed polyhedron describing the delimitation of the "outside" region of the 3D part is thus obtained at the output. This polyhedron is a watertight 3D mesh of the 3D part, and thus the AM printer can build a product representing the 3D part.

Thus, the present invention transforms an input geometry, the surface representation of the 3D part, into a volume representation on which a Flood Fill method is applied. And a non-ambiguous representation is computed from the volume representation on which operation (especially the flood filing) was performed. The present invention preserves the small details of the input geometry with high fidelity while at the same time reliably repair small holes and any intersections where the input geometry is ambiguous. In addition, the computational complexity of the method described here almost only depends on the desired precision for the output. It therefore scales very well with the number of elements in the input, and is also easy to use because of the small number of parameters to adjust. As a matter of fact, a default parametrization can easily be made to make this method a truly automatic "push-button" tool without any user supervision required. A further benefit of the present invention is that different types of geometry can be provided in input of the method. For instance, the 3D part can be a non-uniform rational B-splines (NURB), being understood that any model commonly used in computer graphics for generating and representing curves and surfaces can be used. As another example, the 3D part can be a simple surface model such as the one obtained from a UDAR. Further advantages of the present invention will be discussed thereinafter.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and may be put in balance with the need to implement user's wishes.

For instance, the step of providing a surface representation may be carried upon user action, e.g. the user selects a part. As another example, the step of selecting a band size and/or the step of selecting the size of the voxel(s) may be performed upon user action, e.g. the user selects (or inputs) a value of the band size and/or the voxel size(s).

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS) or a surface obtained from a set of points computed by a UDAR. Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round) and/or standard surfacing features (e.g. sweep, blend, loft, fill, deform, and/or smoothing). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (e.g. a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus, allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled object into elements which physical behaviors can be computed and simulated through equations. Such CAE solutions are provided by Dassault Systèmes under the trademark SIMULIA®. Another growing CAE technique involves the modeling and analysis of complex systems composed of a plurality of components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 2:
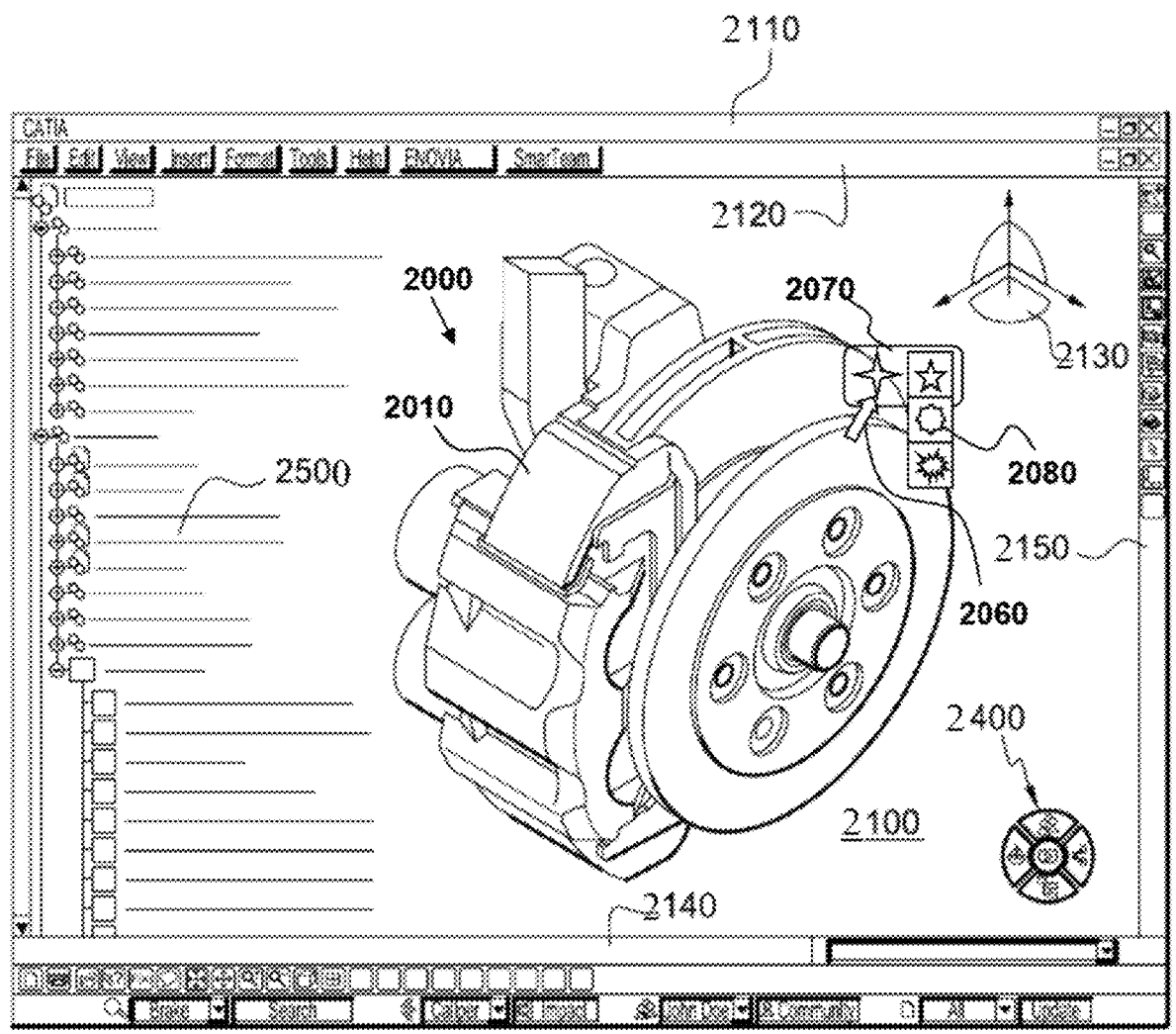
FIG. 2 shows an example of a graphical user interface of a CAD system.

FIG. 2 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
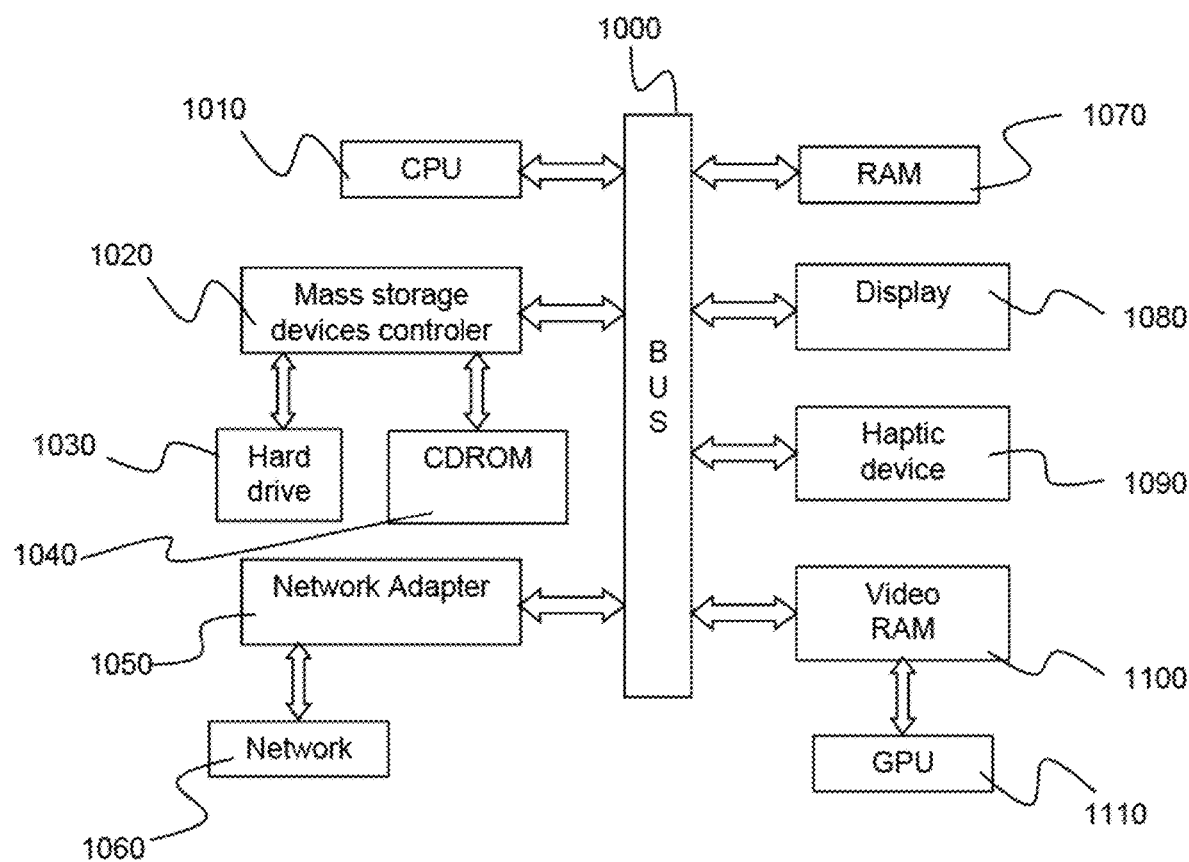
FIG. 3 illustrates an example of a system of the invention.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Additive manufacturing a 3D part" (also referred to as "additive manufacturing a 3D modeled object") designates the process of manufacturing a 3D part by the sequential delivery of energy and/or material to specified points in space to produce the solid 3D part. The material can be, but is not limited to, plastic, metal, concrete . . . . Additive manufacturing (AM) is thus part of a process of elaborating a 3D modeled object. A physical product corresponding to the modeled object (the provided 3D part) is produced. The additive manufactured object may be a product, such as a part, or an assembly of parts. The method improves the creation of an ambiguous representation of a modeled object, and thus the method also improves the manufacturing of a product and thus increases productivity of the manufacturing process.

Referring now to FIG. 1, at step S10, a surface representation of a 3D part is provided in a 3D scene. The surface representation of the 3D part is input data. The surface representation of the 3D part is a geometry that can be a set of points, segments, polygonal faces or more complex elements (e.g. NURBS based surfaces). More generally, the surface representation is a mesh. No information about the orientation or connectivity of these elements is required. For instance, if the 3D part is modeled with NURBS, the representation will be tessellated (e.g. the representation is triangulated). As another example, if the 3D part is obtained from points provided by a UDAR, only a surface is computed from the points.

The 3D scene is the space in which the part is positioned. The 3D scene may use three axes x, y, z for determining the position of the part. More specifically, the 3D scene may be a model of a physical universe, which may be mathematically represented by a geometry which describes every point in 3D space by means of coordinates.

The surface representation is enclosed inside a bounding volume. Bounding volumes are commonly used in computer graphics. The bounding volume is a closed volume that completely contains all the geometries from which the representation of the 3D part is computed. The bounding volume may be, but is not limited to, a bound box, a bounding sphere, . . . .

Figure 4:
FIG. 4 illustrates an example of a surface representation of a 3D object.

FIG. 4 is a picture (a screenshot) of an example of 3D surface representation of a camera design. Each disconnected piece of the design is displayed with a different color, e.g. different level of grey. In this example, the 3D surface is built from NURBS.

Figure 5:
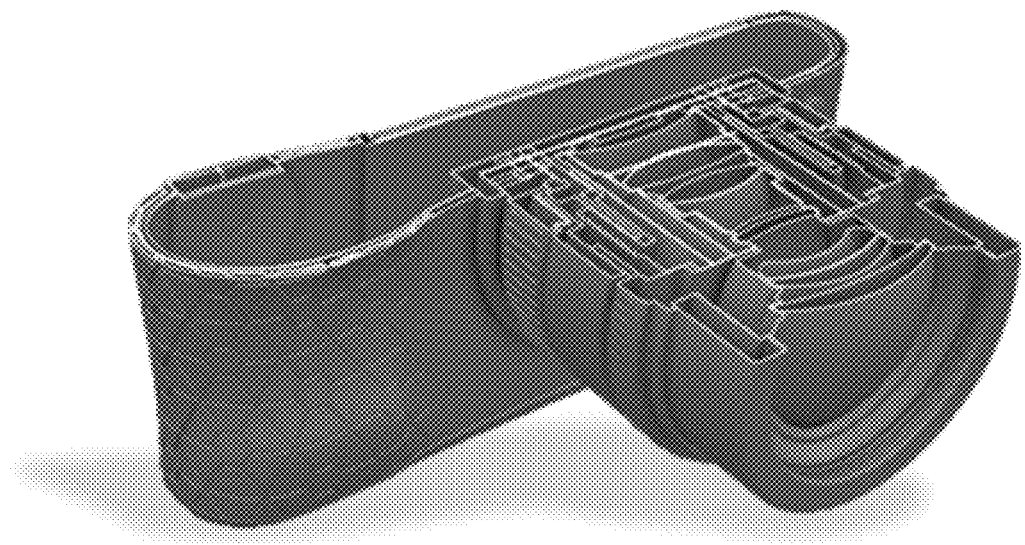
FIG. 5 shows a slicing plane of the 3D object of FIG. 4.
Figure 6:
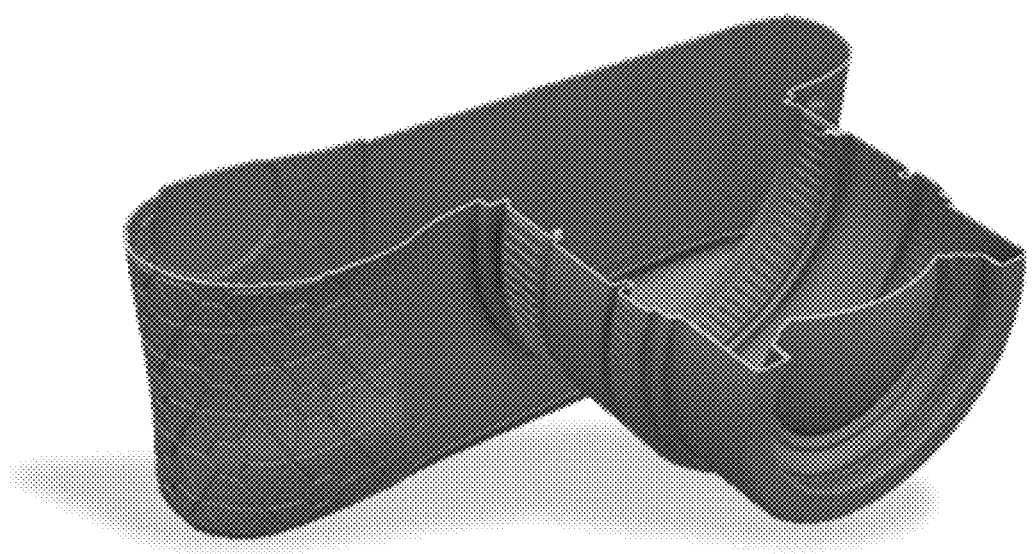
FIG. 6 illustrates an example of a surface representation delimitating regions of 3D object of FIG. 4.

FIG. 5 is also a screenshot of the same design shown on FIG. 4 with a slicing plane to view the internal geometry. This model is composed of more than 800 disconnected components, geometric and topological holes, multiple tangent contacts and intersections.

FIGS. 4 and 5 show a typical example of the construction of a CAD model where the CAD model is fragmented into a set of disconnected pieces with intersections, tangential contacts between the pieces, holes in pieces. This fragmentation into several pieces facilitates for the designer the construction and the modularity the model.

Back to FIG. 1, at step S20, the 3D scene is discretized into voxels. A voxel represents a value on a grid in three-dimensional space, as known in the art. Voxels excel at representing regularly sampled spaces that are non-homogeneously filled. Voxels represent a sub division of the 3D space; they represent a volume of the 3D space. As a result of the discretization, the provided 3D representation that is positioned in the 3D scene is also divided into voxels: some of the voxels enclose a part of the surface representation of the 3D part.

Preferably, the grid is regular. A regular grid may be, but is not limited to, cartesian grid for which the voxels are cubes, a rectilinear grid for which the voxels are rectangles or parallelepiped, or curvilinear grid in which the voxels are quadrilaterals or cuboids. The voxels of a regular grid of voxels sample the whole 3D space, which means that each points of the 3D space belongs to one voxel; in other words, each point of the 3D space is encompassed by one voxel. In the event a point of the 3D space is located at the intersection of two or more voxels, the point will be (arbitrarily) assigned to one of the voxels intersected by the said point. Similarly, the voxels of a non-regular grid of voxels can sample the whole 3D space.

It is to be understood that the discretization of the 3D scene into voxels is not limited to a regular grid and that any discretization and polygon can be used for discretizing the 3D scene. However, regular grids, and more particularly cartesian grid, decrease resource consumption (memory, CPU) of the system that performs the method according to the invention. When a cartesian grid is used to discretize the 3D scene, all the voxels have the same size.

The size of the 3D scene is limited, which means that it is not an infinite space. Thus, the discretization of the 3D scene is possible. To decrease resource consumption (memory, CPU) of the system, the bounding box that encloses the surface representation may be used for defining a working area. In this case, the discretization applies on the working area only, that is, the bounding box of the provided 3D surface is discretized into voxels. The bounding box is subdivided into a grid where each voxel (also referred to as cell) corresponds to a set of coordinates in 3D space.

The size of the voxels may be set by a parameter called "Voxel Size". The selection of the size of the voxel is performed before the discretization is carried out, e.g. just after the step S10. The selection can be done upon user action, e.g. the user selects a value. The selection can be done automatically, e.g. by the system. In both cases (user or automatic selections), the voxel size may be computed according to the size of the bounding volume.

In an example, the size of the voxels for a regular grid may be computed as follows. Let (x, y, z) a referential attached to a bounding box in the 3D scene to be discretized. Let N that is the number of voxels to will discretize the 3D scene; for instance N=500 000 000 for a personal computer. Let L1 the length of the bounding box about x, L2 the length of the bounding box about y, and L3 the length of the bounding box about z. Let VoxelSize representing the volume of a cubic voxel. A value of Voxelsize is computed with the equation (1):

$$VoxelSize = \frac{\sqrt[3]{L1 \times L2 \times L3}}{\sqrt[3]{N}}$$

As a matter of fact, and at least for the reasons explained hereinabove, the grid is a regular cartesian grid for which the voxels are cubes, all the voxels having the same dimensions.

Each voxel can contain a scalar value, which means that each voxel stores (or not) a mathematical number or a value representing a physical quantity. Hence a scalar field is overlaid on the input geometry.

Each voxel may be initialized with an infinite positive value. Alternatively, no value may be associated when voxels are initialized. It is to be understood that the voxels might be initialized with any value, being understood that all the voxels are preferably initialized with an identical value.

Figure 7:
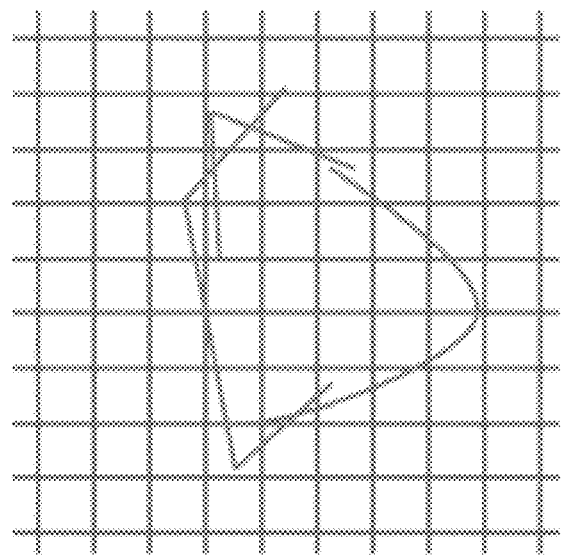
FIGS. 7, 8, 9, 10, 11, 12, 13 and 14 illustrate an example of the method.

FIG. 7 shows a diagram that represents a scalar field as a grid of voxels over the input geometry made of intersecting segments and curves in 2D space. It will be understood that the present invention works in any N-Dimensional space. However, in order to make the visualization and understanding easier, the diagrams of FIGS. 7 to 14 are in two dimensions and the size of the voxels as represented is exaggerated.

Back to the step S30 of FIG. 1, an unsigned distance field is formed (or computed) by storing a minimal distance value to the surface representation of the 3D part, for each voxel. The distance that is measured is typically a Euclidian distance. The distance may be an anisotropic distance or a Manhattan distance. For instance, in the event the dimensions of the 3D part in the 3D scene would be important, the computed values of the Euclidean distances might be too large and in such a case a distance of norm 1 (e.g. Manhattan) might be used. The minimal distance value of each voxel represents the smallest distance that can be measured between a point of a voxel and a position in the 3D space of an element of the input geometry. Any point on the voxel can be selected. But in practice, a particular point of the voxel is selected. Here a particular point means a point than can be easily identified on and for each voxel; for instance, a particular point of a voxel may be an edge of the voxel, the centroid of the voxel . . . . The centroid of the voxel is invariant to rotating or scaling, e.g. the centroid is not affected when the voxel is stretched. The way the minimal distance is computed between a voxel and the surface representation of the 3D part is identical for each voxel: for each voxel, the minimal distance of a voxel will be computed from the centroid of the voxel.

The distance field that is obtained at step S30 is unsigned. This means that the all the scalar values computed, the minimal distances, are values with an identical sign. In practice, the scalar values may be all positive. Alternatively, they may be all negative.

Similarly, the minimal distance is also measured for each voxel that encloses an element of the input geometry. If the input geometry (the surface representation of the 3D part) intersects the point of the voxel serving at measuring the distance, then the distance is 0; the value 0 can signed, and the selected sign is the same as those used for the other values of the scalar field. If the input geometry does not intersect the point of the voxel serving at measuring the distance, then a value (that can be very small) is measured.

At the output of the step S30, a scalar value has been set for each voxel, thus transforming the scalar field of step S20 into what is known as a distance field. The distance field may be formed by storing the minimal distance values in a first matrix. Here the term matrix designates a set of cells that form a table of columns and rows that comprises scalar values. Each cell of the matrix corresponds to one of the voxels. That is, each cell of the matrix is associated with a set of coordinates in the 3D pace of the voxel the cell is associated with, and each cell of the matrix comprises the scalar value of the voxel. The set of cells of the matrix forms the so-called distance field, which is a scalar field.

The matrix may be structured by three ways, as known in the art. The first one is to store a "full" matrix, that is, each voxel of the grid is allocated in memory at the time of the creation of the matrix in the memory. The second one comprises storing in memory a "sparse" matrix; only interesting values (e.g. those that are lower than the "band size", which is discussed below) are allocated in memory as couples <coordinates; values>. Less memory is used, but more computing resources (CPU time) are required for retrieving a value from the memory. The third example is the creation of an octree that advantageously provides lower memory footprint and faster access time. This third example is preferably used for implementing the matric, being understood that any other implementation might be used.

In an example, the step S30 is performed after the selection of a pre-determined distance value, which is called "band size". The "band size" allows to define a first collection of voxels having a minimal distance to a geometry of the 3D part that is lower or equal to the pre-determined value; and a second collection of voxels with a distance to a geometry of the 3D part that is greater to the pre-determined value. It will be understood that the first collection might comprise voxels with a minimal distance that is lower to the pre-determined value, and that the second collection might comprise voxel with a minimal distance that is greater or equal to the pre-determined distance.

The selection of the band size can be performed upon user action. For instance, the user inputs a value; this is performed as known in the art. The selection of the band size can be done automatically; for instance, the band size is comprised between 2 and 8 times the size of the voxels, with the size of a voxel that may be the length of the edge of the voxel in the case the grid is a regular grid of cubes.

After the selection of the band size, it is first determined a set of voxels having a minimal distance value to that is greater than the band size. This set of voxels thus comprises the voxels that are considered sufficiently distant from the surface of the 3D part. The voxels of the set are then assigned a value. This value is different from the values comprises between 0 and the band size. In practice, the value assigned to the voxels of the set is the same for all the voxels of the set. As mentioned previously, all the voxels may be initialized with an infinite positive value: in this situation, the voxels of the set keep the infinite positive values they are associated with. As any distance greater than the band size parameter is ignored, the unsigned distance field that is formed (S30) consists of a narrow band of distance values around the surface representation of the 3D part. Hence, an unsigned narrow band distance field is obtained around the surfaces of the 3D part. The distance value of a narrow band may be positive or negative.

Figure 8:
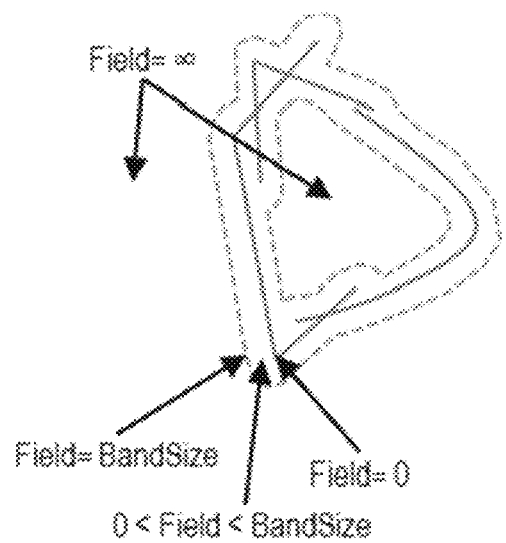

FIG. 8 shows an example of the scalar field of FIG. 7 at the output of the step S30. In this example, a band size has been selected, thus forming an unsigned narrow band (represented with dashed lines) over the input geometry. The distance between the input geometry and the dashed lines is constant and equal to the value of the selected band size. The distance field obtained as a result of the step S30 takes the form of a smooth ramp equal to zero on the input geometry, and increases until it reaches the values of the band size at which point it jumps to the value infinity.

In an example, the values of the voxels having a minimal distance value that is greater than the band size are not stored in the matrix. For instance, empty cell of the matrix may be interpreted as meaning an infinite positive value is associated with the cell. Thus, the quantity of values stored in the matrix is decreased, which in turn decreases memory usage of the system that runs the method.

Back to FIG. 1, at step S40, one or more voxels that are located outside the bounding volume are determined (or identified). These voxels are also referred to as seeds in reference to the next step of propagation. Located outside means that there is no intersection between the bounding volume and each voxel of the said one or more voxels. These one or more voxels outside the bounding volume may be automatically selected by the system (e.g. by discarding the voxels that intersect the bounding volume), or they may be selected upon user action (e.g. the user performs a user action such as a click outside the bounding volume that may be represented to help the user is doing the selection).

Each voxel of the said one or more voxels located outside the bounding volume is associated with a label. A label may be also referred to as a tag and is a piece of information, e.g. a bit. Associating a label to a voxel means that there is a direct or indirect link between the voxel and the label so that it is possible to access the label from the voxel. The other voxels (those not inside the bounding volume) may be associated or not with a label, being understood that their label is different from those of the voxels outside the bounding volume. For instance, the one or more voxels located outside the bounding volume may be associated with a label "outside". The label "outside" means that associated voxel is not enclosed or does not intersect the surface representation of the 3D part. The voxels that are inside the bounding volume may be initialized with no label, or with a label "inside" which significates that the voxel is enclosed or intersects the bounding volume.

Alternatively, the step S40 may comprise determining one or more voxels located inside the bounding volume. These one or more voxels inside the bounding volume may be automatically selected by the system (e.g. by discarding the voxels that do not intersect the bounding volume), or they may be selected upon user action (e.g. the user performs a user action such as a click inside the bounding volume that may be represented to help the user is doing the selection). When the one or more voxels have been selected, a label is associated to each selected voxel. The selection of the label is carried out upon user action: the user chooses a label according to the region the voxels belongs to. For instance, the selected label for each determined voxel may be the aforementioned labels "inside" and "outside". As another example, the selected label may be "material_x", where x designate a type of material of the 3D part.

Figure 9:
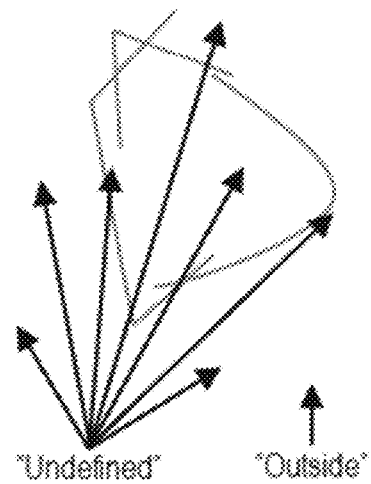

FIG. 9 illustrates an example for which each voxel is given a label defining the region to which it belongs to. No specific seed is given. Therefore, every voxel is labelled "undefined" except for a single automatically selected voxel which is given the label "outside".

Next, at step S50 of FIG. 1, the one or more labels associated at step S40 are propagated. The propagation of the label(s) is performed by flood filling. Flood fill is an algorithm that determines the area connected to a given node in a multi-dimensional array. Flood fill algorithm is known in the art. The flood fill method iteratively propagates the labels of the voxels to their neighbors. The propagation of the label from a labelled voxel to an unlabeled voxel stops when a stopping condition is met. The stopping condition is reaching a gradient inversion of the distance field. As an example, this means that in the case of a single "outside" label associated to a voxel outside the bounding volume, as discussed in reference to step S40, it will spread around the surface representation until it comes into contact with the elements of the input geometry without passing through them (because that would mean to increase the distance again).

In an example, the propagation by flood filing of the label may comprise a first step of comparing the value of the minimal distance value of labelled voxel with the value of the minimal distance value of a neighbor unlabeled voxel. A neighbor voxel is a voxel that shares at least one common geometric element with another voxel. For instance, two voxels that share a common edge are neighbor; as another example, two voxels that share one common vertex are neighbor. Then, the label is propagated from the labelled voxel to the neighbor unlabeled voxel if the minimal distance value of the neighbor unlabeled voxel is equal or lower that the value of the minimal distance value of labelled voxel.

As already discussed, a label will propagate from one voxel to another only if its distance to the input geometry stays constant or decreases based on the scalar values of the distance field. In other words, the stopping condition of the flood fill is a negative sign in the gradient of the unsigned narrow band of the distance field. Thus, the stopping condition depends at least on the band size, as shown in the examples of FIGS. 10 to 12.

Figure 10:
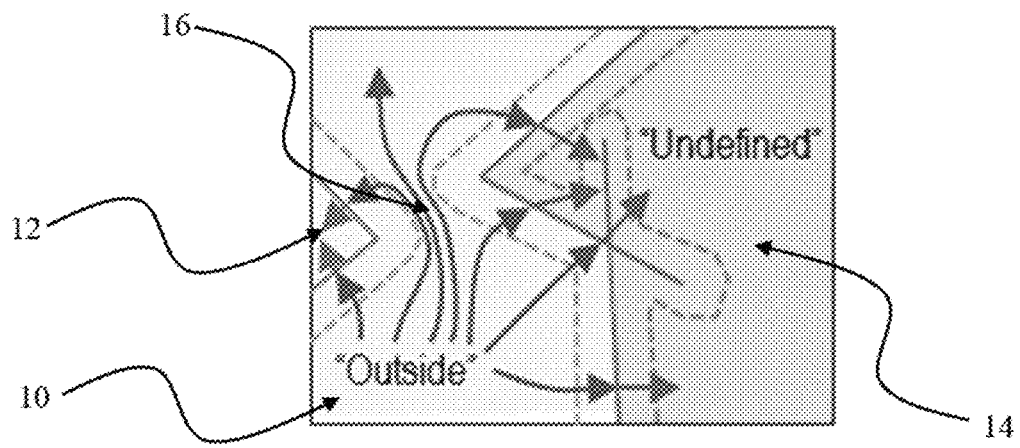

FIG. 10 illustrates an example where the label outside is propagated. The unsigned narrow band of the distance field is represented with dashed lines, and the input geometry of step S10 is represented in plain lines. The arrows extending from "Outside" can propagated in the volume 10 comprises between two volumes 12, 14, the two volumes 12, 14 being inside the surface representation of the 3D part (the voxels of these two volumes 12, 14 intersect the 3D part). The propagation gets stopped by the field gradient that increases; the increase starts from the surface representation of the 3D part. The two (respectively 4) arrows extending from the surface representation in the volume 12 (respectively 14) illustrate the stop of the propagation.

Interestingly, FIG. 10 shows that the selection of the band size can modify the behavior of the propagation. In this example, the label is able to propagate through the narrowing 16 because the two unsigned narrow bands do not overlap. In the case the band size would be increased, the two unsigned narrow bands might overlap and the narrowing 16 disappear, the propagation being no more possible.

Figure 11:
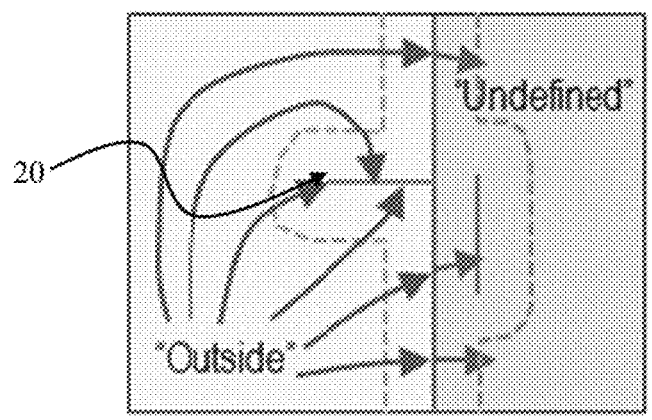
Figure 12:
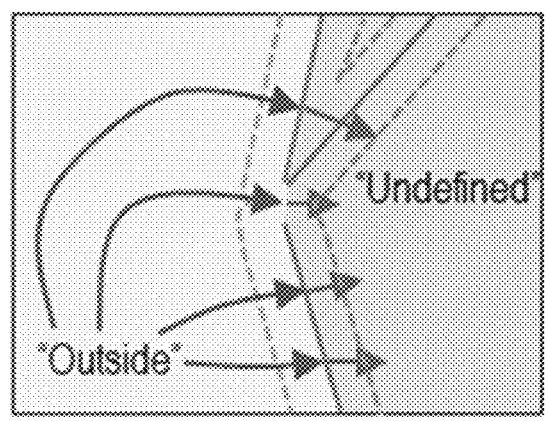

FIG. 11 illustrates an example where non-manifold element 20 has been implicitly resolved. Indeed, any element of the input geometry (e.g. single point, triangular face . . . of the surface representation of the 3D part) which can be approached from either side will be "eaten" as the label can spread from both sides while consistently decreasing its distance to it.

FIG. 12 illustrates an example of the good selection of the value of the band size. If there is a hole smaller than the band size in the surface representation of the 3D part, the label will not be allowed to spread though it because it would have to increase its distance to the edges of the hole to continue spreading. On the contrary, if there is a hole larger than or equal to the band size in the surface representation of the 3D part, the label will be allowed to propagate. The band size is thus the maximum radius of holes of the surface representation of the 3D part that can be closed as a result of the propagation.

The band size is strictly larger than the maximal size of voxel observed. In practice, the band size is equal to or greater than twice a size of a voxel. The size of a voxel may be the length of the edge of the voxel in the case the grid is a regular grid of cubes. If the voxels of the grid are not cubic (e.g. rectangular, parallelepiped), the size of a voxel will be the maximal size (e.g. largest edge) of a voxel among the voxels of the grid. If the voxels of the grid are not a parallelepiped, the voxel size retrained is the largest distance provided by a voxel among the voxels sampling the 3D scene. It is to be understood that a band size value that is equal to two times the size of a cube does not ensure that all the holes of the surface representation will not be traversed during the propagation. However, this band size value allows to avoid propagation for most of the holes of a surface representation and to decrease memory consumption when storing the result of the propagation. Holes with a diameter that is strictly smaller than the band size will be filled out.

When the Flood-Fill is finished (i.e. propagation has stopped) each contiguous collection of voxels sharing the same label represents a region. The surface intersections and non-manifold elements have been implicitly resolved. Isolated elements have been removed. Holes smaller than the Band Size have been closed making sure that regions are properly delimited.

Next, at step S60, the sign of the distance value of all unlabeled voxels is inverted. The distance filed that was unsigned is now a signed distance field. A change of sign represents passing through a first region to a second one. For example, in the case of the single "outside" label associated to a voxel outside the bounding volume, as discussed in reference to step S40, switching the sign of the scalar values whose voxel label remained "undefined" is possible because the magnitudes of the Distance Field values is no modified and only their sign is changed. The maximum of accuracy of the distance field on the input geometry elements of the 3D part is thus preserved.

Figure 13:
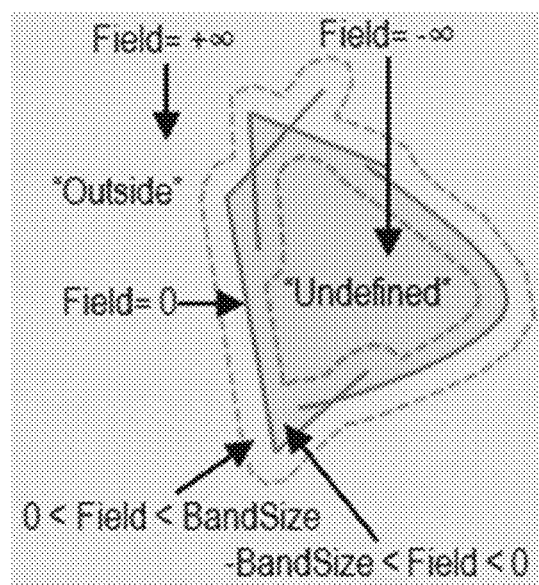

FIG. 13 illustrates an example of the output of the step S60. The unsigned narrow band of the distance field is represented with dashed lines and is over the surface representation of the 3D part. The voxels lefts "Undefined" have been given a negative sign while the voxels with the "Outside" label kept their positive sign. The voxels with the distance value=0 represents the surface of the 3D part.

In an example, all the labels associated with the voxels are stored in a second matrix. The second matrix may be distinct from the first matrix. The first and second matrices may be structured the same way as already discussed in relation with step S30.

At step S70 of FIG. 1, an iso-surface of the 3D part is computed at iso-value zero. The computation is based on the signed distance field obtained at the output of step S60. Iso-Surface Meshing methods work by generating a mesh of polygonal surface elements at the interface where values of a scalar field pass a given threshold. This threshold is called iso-value. By using an Iso-Surface Meshing with the iso-value set to zero, an unambiguous closed polyhedron describing the delimitation of the "outside" region is generated.

The generation of the boundaries around each labelled region is performed using an iso-surface reconstruction method that may be, but is not limited to, Marching Cubes, Dual Contouring . . . .

Figure 14:
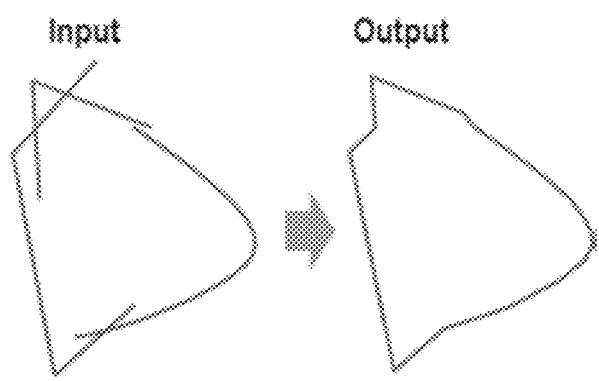

FIG. 14 illustrates the iso-meshing of step S70 where the surface at iso-value zero has been generated and benefit from the accuracy of the distance value near the input geometry while still having the capability to close geometric holes in the surface representation of the 3D part (represented on the left of FIG. 14).

In addition, the computational complexity of the method described here almost only depends on the desired precision for the output. It therefore scales very well with the number of elements in the input, and is also easy to use because of the small number of parameters to adjust. As a matter of fact, a default parametrization can easily be made to make this method a truly automatic "push-button" tool without any user supervision required.

Then, at step S80, the 3D part provided at step S10 is manufactured by use of additive manufacturing technique from the iso-mesh provided at the output of step S70. This is performed as known in the art.

The invention claimed is:

1. A computer-implemented method of additive manufacturing of a three-dimensional (3D) part, comprising:
    obtaining a surface representation of a 3D part in a 3D scene, the surface representation being enclosed inside a bounding volume;
    discretizing the 3D scene into voxels;
    forming an unsigned distance field by storing a minimal distance value to the surface representation of the 3D part for each voxel;
    determining one or more voxels located outside the bounding volume, the one or more voxels located outside the bounding volume being associated with a label;
    propagating flood filling the label until a stopping condition is met, which is reaching a gradient inversion of the distance field;
    inverting the sign of a distance value of all unlabeled voxels to obtain a signed distance field;

computing an iso-surface of the 3D part at iso-value zero based on the signed distance field; and additive manufacturing the 3D part, wherein the propagating by flood filling the label until the stopping condition is met further comprises:

comparing the value of the minimal distance value of labelled voxel with the value of the minimal distance value of a neighbor unlabeled voxel, and propagating the label to the unlabeled voxel if the minimal distance value of the neighbor unlabeled voxel is equal or lower that the value of the minimal distance value of labelled voxel.

2. The computer-implemented method of claim 1, wherein storing a minimal distance value to the surface representation of the 3D part for each voxel further comprises:

determining the voxels having a minimal distance value that is greater than a band size, the band size being a pre-determined distance value; and assigning a same value to the determined voxels, the same value being different from the values comprises between 0 and the band size.

3. The computer-implemented method of claim 2, wherein the band size is equal to or greater than twice a size of a voxel.

4. The computer-implemented method of claim 1, wherein the minimal distance values are stored in a first matrix, each cell of the first matrix corresponding to a voxel with a set of coordinates in 3D space and each cell of the first matrix containing a scalar value, a set of cells of the first matrix forming a scalar field.

5. The computer-implemented method of claim 4, wherein the values of the voxels having a minimal distance value that is greater than a band size are not stored in the matrix.

6. The computer-implemented method of claim 1, further comprising, before discretizing the 3D scene:

selecting a size of the voxels that discretize the 3D scene.

7. The computer-implemented method of claim 4, further comprising:

storing in a second matrix labels associated with voxels.

8. The computer-implemented method of claim 7, wherein the first matrix and the second matrix are distinct.

9. The computer-implemented method of claim 2, wherein the minimal distance values are stored in a first matrix, each cell of the first matrix corresponding to a voxel with a set of coordinates in 3D space and each cell of the first matrix containing a scalar value, a set of cells of the first matrix forming a scalar field.

10. The computer-implemented method of claim 3, wherein the minimal distance values are stored in a first matrix, each cell of the first matrix corresponding to a voxel with a set of coordinates in 3D space and each cell of the first matrix containing a scalar value, a set of cells of the first matrix forming a scalar field.

11. The computer-implemented method of claim 9, wherein the values of the voxels having a minimal distance value that is greater than the band size are not stored in the matrix.

12. The computer-implemented method claim 2, further comprising, before discretizing the 3D scene:

selecting a size of the voxels that discretize the 3D scene.

13. The computer-implemented method of claim 3, further comprising, before discretizing the 3D scene:

selecting a size of the voxels that discretize the 3D scene.

14. The computer-implemented method of claim 4, further comprising, before discretizing the 3D scene:

selecting a size of the voxels that discretize the 3D scene.

15. The computer-implemented method of claim 5, further comprising, before discretizing the 3D scene:

selecting a size of the voxels that discretize the 3D scene.

16. The computer-implemented method of claim 2, further comprising:

storing in a second matrix labels associated with voxels.

17. The computer-implemented method of claim 3, further comprising:

storing in a second matrix labels associated with voxels.

18. A computer readable storage medium having recorded thereon a computer program that when executed by a computer causes the computer to implement a computer-implemented method of instructing additive manufacturing of a three-dimensional (3D) part, comprising:

obtaining a surface representation of a 3D part in a 3D scene, the surface representation being enclosed inside a bounding volume;

discretizing the 3D scene into voxels;

forming an unsigned distance field by storing a minimal distance value to the surface representation of the 3D part for each voxel;

determining one or more voxels located outside the bounding volume, the one or more voxels located outside the bounding volume being associated with a label;

propagating flood filling the label until a stopping condition is met, which is reaching gradient inversion of the distance field;

inverting the sign of a distance value of all unlabeled voxels so as to obtain a signed distance field;

computing an iso-surface of the 3D part at iso-value zero based on the signed distance field; and instructing additive manufacturing of the 3D part, wherein the propagating by flood filling the label until the stopping condition is met further comprises:

comparing the value of the minimal distance voxel of labelled voxel with the value of the minimal distance value of a neighbor unlabeled voxel, and propagating the label to the unlabeled voxel if the minimal distance value of the neighbor unlabeled voxel is equal or lower that the value of the minimal distance value of labelled voxel.

19. A system comprising:

a processor coupled to a memory and a graphical user interface, the memory having recorder thereon a computer program that when executed by the processor causes the processor to instruct additive manufacturing of a three-dimensional (3D) part by being configured to:

obtain a surface representation of a 3D part in a 3D scene, the surface representation being enclosed inside a bounding volume;

discretize the 3D scene into voxels;

form an unsigned distance field by storing a minimal distance value to the surface representation of the 3D part for each voxel;

determine one or more voxels located outside the bounding volume, the one or more voxels located outside the bounding volume being associated with a label;

propagate by flood filling the label until a stopping condition is met, which is reaching a gradient inversion of the distance field;

invert the sign of a distance value of all unlabeled voxels so as to obtain a signed distance field;

compute an iso-surface of the 3D part at iso-value zero based on the signed distance field; and instruct additive manufacturing of the 3D part, wherein the processor is further configured to propagate by flood filling the label until the stopping condition is met by being further configured to:

compare the value of the minimal distance value of labelled voxel with the value of the minimal distance value of a neighbor unlabeled voxel, and propagate the label to the unlabeled voxel if the minimal distance value of the neighbor unlabeled voxel is equal or lower that the value of the minimal distance value of labelled voxel.

* * * * *